United States Patent
Vermilyea et al.

(10) Patent No.: US 6,377,658 B1
(45) Date of Patent: Apr. 23, 2002

(54) SEAL FOR LIQUID METAL BEARING ASSEMBLY

(75) Inventors: Mark Ernest Vermilyea; Antonio Alberto Mogro-Campero, both of Niskayuna; Subhasish Roychoudhury, Albany; Daniel John Noonan, Middle Grove, all of NY (US); Vivek Bhatt, Wauwatosa, WI (US); Liangfeng Xu, Irving, TX (US); Suryaprakash Ganti, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/682,149

(22) Filed: Jul. 27, 2001

(51) Int. Cl.[7] ................................................. H01J 35/10
(52) U.S. Cl. ....................................... 378/131; 378/132
(58) Field of Search ................................. 378/131, 132, 378/125, 143, 144; 384/132, 100; 277/96.1

(56) References Cited

U.S. PATENT DOCUMENTS

| | | | |
|---|---|---|---|
| 4,210,371 A | 7/1980 | Gerkema et al. | 308/9 |
| 4,275,891 A * | 6/1981 | Boes | 277/96.1 |
| 4,301,487 A * | 11/1981 | Maruyama | 360/107 |
| 4,357,355 A | 11/1982 | Koch et al. | 426/4 |
| 4,562,587 A | 12/1985 | Gerkema et al. | 378/133 |
| 4,614,445 A | 9/1986 | Gerkema et al. | 384/368 |
| 4,641,332 A | 2/1987 | Gerkema et al. | 378/133 |
| 4,644,577 A | 2/1987 | Gerkema et al. | 378/132 |
| 5,068,885 A | 11/1991 | Vetter | 378/133 |
| 5,165,699 A * | 11/1992 | Shrontz et al. | 277/1 |
| 5,189,688 A | 2/1993 | Ono et al. | 378/133 |
| 5,210,781 A | 5/1993 | Ono et al. | 378/125 |
| 5,381,456 A | 1/1995 | Vetter et al. | 378/132 |
| 5,559,852 A | 9/1996 | Vetter | 378/133 |
| 5,575,567 A * | 11/1996 | Brown | 384/132 |
| 5,583,906 A * | 12/1996 | Sugiura et al. | 378/132 |
| 5,602,898 A | 2/1997 | Vetter et al. | 378/132 |
| 5,826,885 A * | 10/1998 | Helgeland | 277/302 |
| 5,875,227 A | 2/1999 | Bhatt | 378/132 |
| 5,991,361 A | 11/1999 | Bhatt | 378/132 |
| 5,991,561 A | 11/1999 | Okamoto et al. | 399/66 |
| 5,995,584 A | 11/1999 | Bhatt | 378/125 |
| 6,125,168 A | 9/2000 | Bhatt | 378/132 |
| 6,192,107 B1 * | 2/2001 | Price et al. | 378/130 |

OTHER PUBLICATIONS

Effect of the Centrifugal and Capillary Forces on the Free Surface Shape of a Magnetic Liquid Seal A.N. Vislovich, et al., Jan.–Mar. 1994, vol. 30, No. 1. pp. 77–86 & pp. 67–74.
Effect of Centrifugal and Capillary Forces on the Shape of a Free Surface of a Magnetic Fluid Seal, A.N. Vislovich et al., Jan.–Mar. 1994, pp. 77–86.
Unipolar Electric Machines with Sealed Liquid–Metal Contact A.I. Kuznetsov et al., 1987, pp. 80–84.
Optimal Relationship is an Induction Liquid–Metal Seal N.A. Morozov et al., Sep. 1992, pp. 374–378.

* cited by examiner

*Primary Examiner*—Robert H. Kim
*Assistant Examiner*—Irakli Kiknadze
(74) *Attorney, Agent, or Firm*—Enrique Abarca; Patrick K. Patnode

(57) ABSTRACT

The present invention provides, in one embodiment, a bearing assembly consisting of a rotatable shaft and a stator coaxially aligned. The stator has at least one circumferential protrusion that contains respective segments that extend radially from the stator. Each of the respective segments contains at least one capture cavity and has a main cavity disposed between each of the respective segments so as to house a thermal shunt. A plurality of roller bearings are also disposed radially between the rotatable shaft and the stator. In addition, at least one viscoseal is disposed on the rotatable shaft.

29 Claims, 3 Drawing Sheets

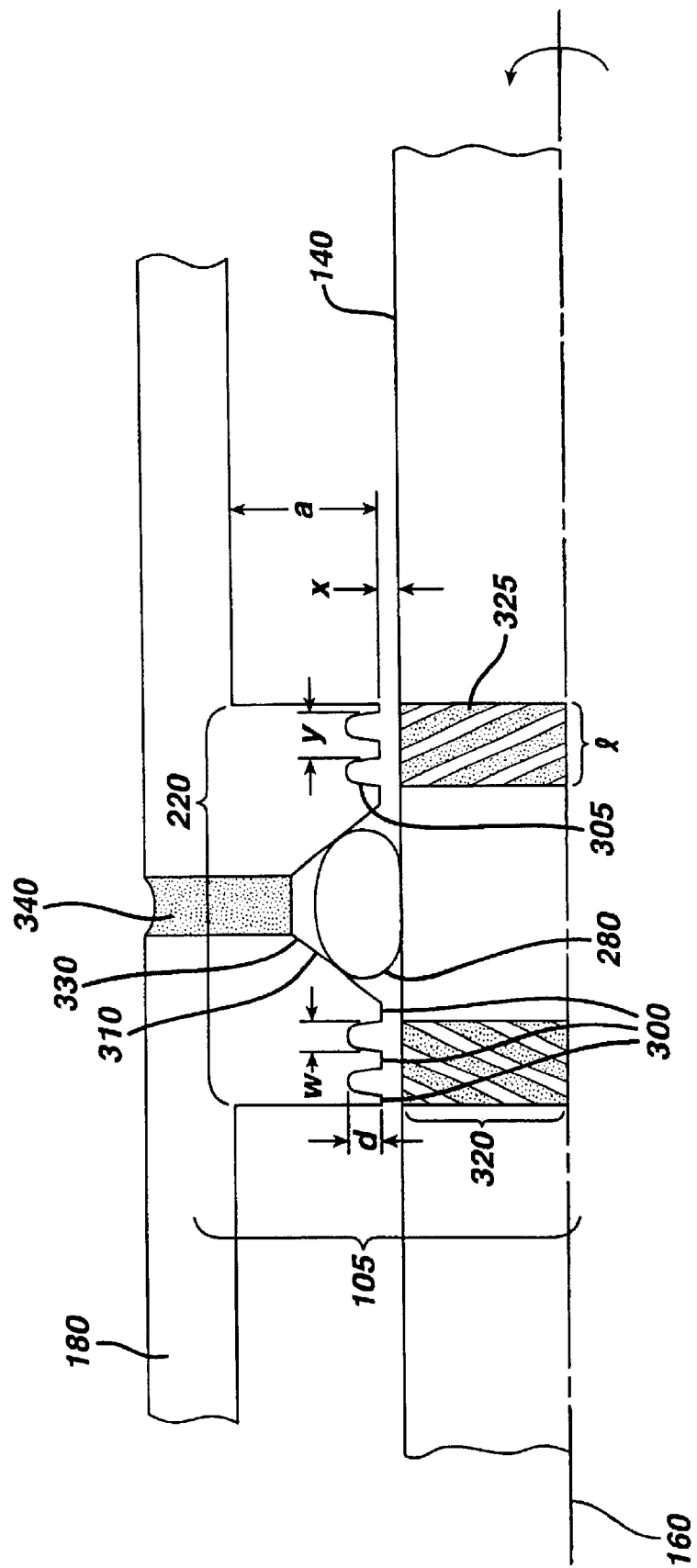

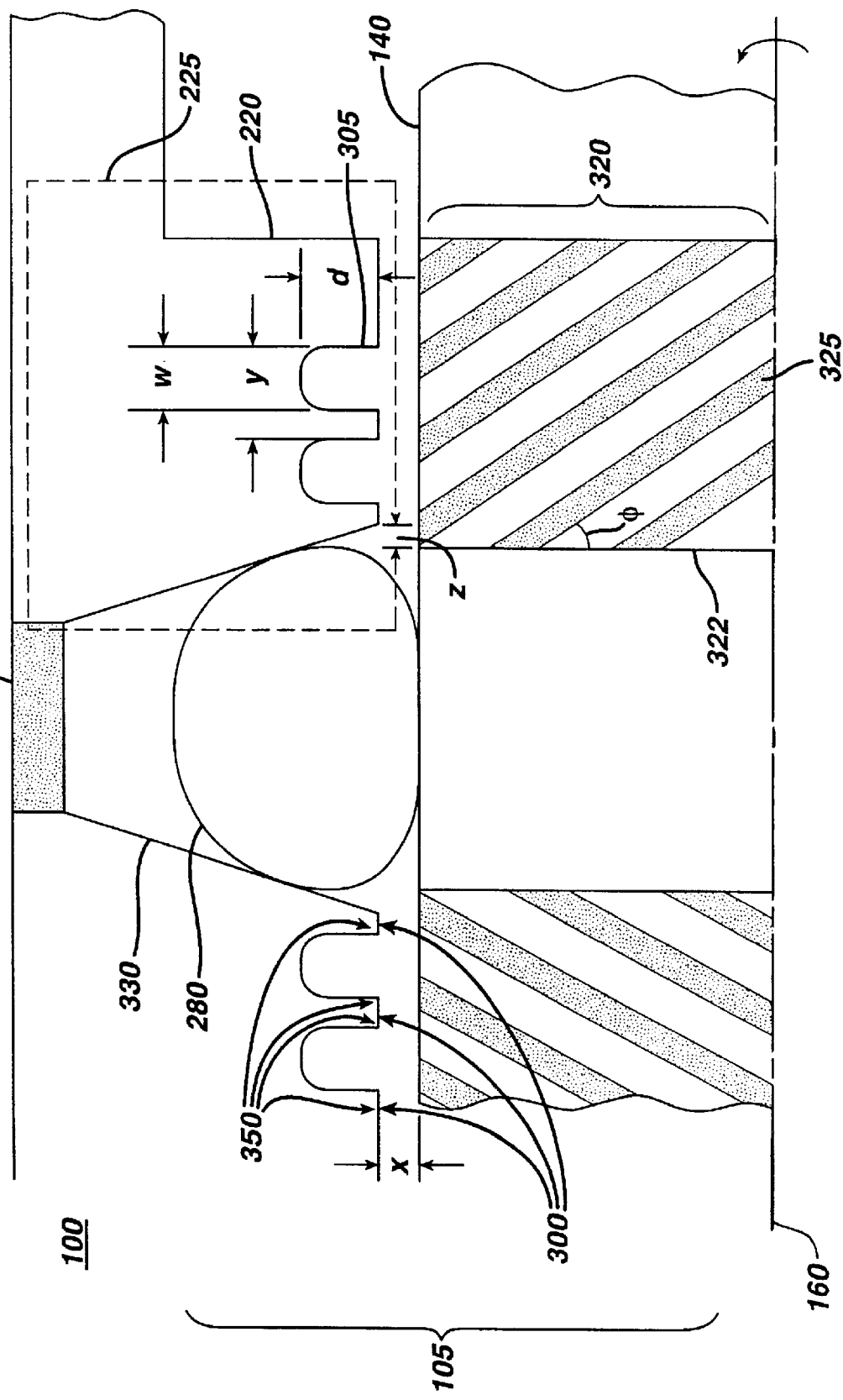

SEAL FOR LIQUID METAL BEARING ASSEMBLY

BACKGROUND OF INVENTION

This invention relates generally to x-ray tubes, and more particularly to x-ray tube bearing assemblies.

X-ray equipment used in for diagnostic imaging typically includes a rotating anode x-ray tube. Such x-ray tubes are vacuum tubes, each including a rotatable shaft and a stator which circumferentially surrounds, or is circumferentially surrounded by, the rotatable shaft. A pair of bearings, such as rolling element bearings (e.g., ball bearings), are positioned radially between the shaft and the stator. An x-ray target, which typically is attached to the rotatable shaft, is heated to high temperatures by impinging electrons emitted by the cathode. The bearings are poor thermal conductors, commonly resulting in a temperature differential between the shaft side and the stator side of the bearings causing misalignment and wear which limits the operating power of the x-ray tube. During high voltage operation, the bearings are prone to electrical arcing which is a disadvantage in designs requiring a stable electrical path between the shaft and the stator. Known designs include those which use liquid metal (such as Gallium or Gallium alloys) in the annularly-cylindrical gap between the shaft and the stator as a hydrodynamic bearing as well as to conduct heat and electricity. Such liquid metal equalizes the temperature on both sides of the bearing which increases bearing life; however, such designs are at risk of leakage of the liquid metal out of the gap with such escaped liquid metal causing electrical (high voltage) instability which shortens the operating life of the x-ray tube.

What is needed, for x-ray tubes employing liquid metal for thermal and/or electrical conduction purposes, is an improved x-ray tube design which prevents leakage of the liquid metal from the gap between the shaft and the stator.

SUMMARY OF INVENTION

The present invention provides, in one embodiment, a bearing assembly consisting of a rotatable shaft and a stator coaxially aligned. The stator has at least one circumferential protrusion that contains respective segments that extend radially from the stator. Each of the respective segments contains at least one capture cavity and has a main cavity disposed between each of the respective segments so as to house a thermal shunt. A plurality of roller bearings are also disposed radially between the rotatable shaft and the stator. In addition, at least one viscoseal is disposed on the rotatable shaft.

BRIEF DESCRIPTION OF DRAWINGS

FIG. 2 is a schematic cross-sectional view of an x-ray tube assembly of the present invention; and FIG. 3 is a schematic cross-sectional view of an x-ray tube assembly of the present invention.

DETAILED DESCRIPTION

Figure 1:
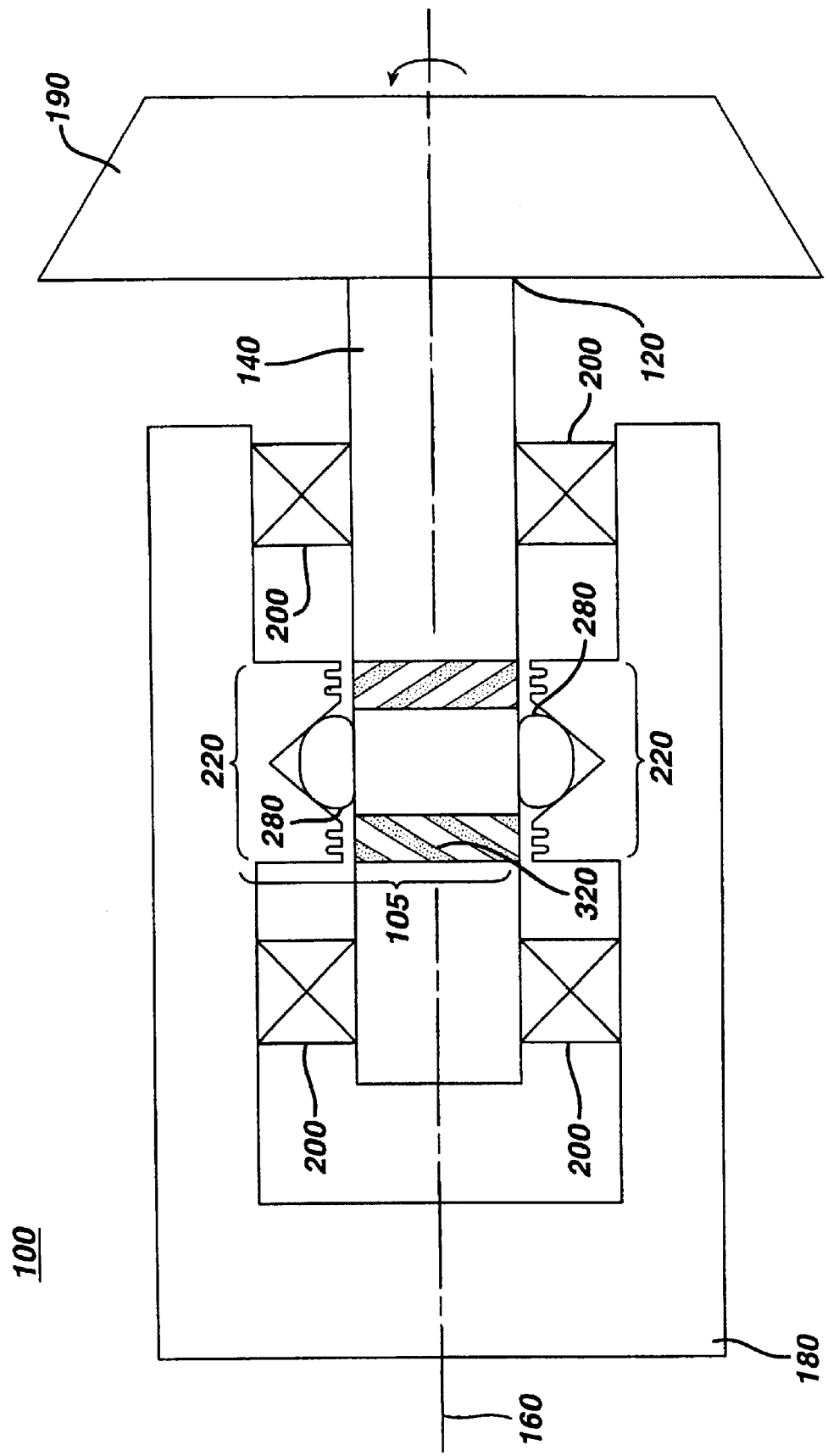
FIG. 1 is a schematic cross-sectional view of an x-ray tube assembly of the present invention.

An x-ray tube assembly 100 in the present invention typically comprises an x-ray tube rotor 120 having a rotatable shaft 140 with a generally longitudinally extending axis 160 and further includes an x-ray tube stator 180 generally coaxially aligned with axis 160 and radially spaced apart from rotatable shaft 140 (as shown in FIG. 1). Preferably, stator 180 circumferentially surrounds rotatable shaft 140. Other constructions include, for example, those having the rotatable shaft 140 circumferentially surrounding stator 180 and those having rotor 120 circumferentially surrounding one portion of stator 180 with another portion of stator 180 circumferentially surrounding rotor 120, as can be appreciated by those skilled in the art. An x-ray tube target 190 is shown attached to an end of rotatable shaft 140. By way of example, and not limitation, the arrangement described herein is the one which stator 180 surrounds rotatable shaft 140.

X-ray tube assembly 100 typically comprises a plurality of bearings 200 disposed radially between rotatable shaft 140 and stator 180. Preferably, bearings 200 are rolling element bearings. Exemplary rolling element bearings are typically selected from the group consisting ball bearings, cylindrical bearings and tapered bearings. However, the type and composition of bearings 200 are left to the artisan. For example, and without limitation, some applications may call for metal bearings while other applications may call for ceramic bearings.

X-ray tube assembly 100 additionally includes at least one circumferential protrusion 220 (see FIG. 2) radially extending from stator 180 by a first radial distance a from stator 180. First radial distance a" is typically in the range between about 1 mm and about 20 mm for circumferential protrusion 220. In one embodiment, circumferential protrusion 220 typically is disposed to be coupled to at least one threaded cavity 340. The liquid metal material for forming the thermal shunt (discussed below) can be added through threaded cavity 340. Circumferential protrusion 220 comprises respective segments 225 (one of which is outlined in phantom in FIG. 3) that extend from stator 180 so as to define therebetween a main cavity 330. Each segment 225 typically comprises at least one capture cavity 305. In one embodiment, circumferential protrusion 220 (see FIG. 1) is disposed longitudinally between respective longitudinally adjacent bearings 200. Main cavity 330 is typically adapted to house a thermal shunt 280. Adapted, as used herein, refers to main cavity 330 having a shape and disposition with respect to rotatable shaft 140 so as to maintain the structural integrity of thermal shunt 280. A wetting agent 310 is also commonly applied to main cavity 330; such agents rare known to those skilled in the art of x-ray tubes and include, e.g., gold (Au). Main cavity 330 typically has a shape (in cross-sectional view) that is square, trapezoid, or irregular.

Thermal shunt 280 commonly comprises metal which is typically liquid at the operating temperature of assembly 100. Preferably, thermal shunt 280 is liquid at room temperature. Thermal shunt 280 is radially disposed on rotatable shaft 140 and within main cavity 330. In one embodiment, thermal shunt 280 is in conductive thermal contact with rotatable shaft 140 and main cavity 330. In an exemplary embodiment, thermal shunt 280 comprises liquid metal. The term metal includes, without limitation, mixtures and alloys. Thermal shunt 280 typically comprises gallium, gallium alloys, or a combination thereof. For example, and without limitation, gallium alloys comprise indium (In) and tin (Sn).

Circumferential protrusion 220 has a first surface 300 which faces rotatable shaft 140, and is typically coated with an anti-wetting agent (not shown). Typical anti-wetting agents are known to those skilled in the art of x-ray tubes and preferred anti-wetting agents are typically titanium dioxide and titanium nitride. In the present invention, anti-wetting agents are used in conjunction with a viscoseal 320 to repel escaping thermal shunt droplets (not shown), for example, back to main cavity 330. A second radial distance x is defined as the distance between circumferential protrusion first surface 300 and rotatable shaft 140. Second radial distance x forms a capillary edge seal to repel any escaping thermal shunt droplets, for example, from main cavity 330. Repelling is defined as capillary forces formed by radial distance x and anti-wetting agent 300 disposed on circumferential protrusion first surface 300 working in conjunction to keep escaping thermal shunt droplets in main cavity 330. As used herein, on, over, above, under and the like are used to refer to the relative location of elements of x-ray tube assembly 100 as illustrated in the Figures and is not meant to be a limitation in any manner with respect to the orientation or operation of assembly 100. Capillary edge seal is formed by selecting second radial distance x to have a dimension so as to affect the relative attraction of thermal shunt molecules to each other when thermal shunt 280 is in juxtaposition with circumferential protrusion first surface 300 and rotatable shaft 140. The radial distance x is typically in the range between about 10 $\mu$m and about 200 $\mu$m.

Rotatable shaft 140 comprises at least one viscoseal 320 which is disposed on rotatable shaft 140 so as to be opposite to circumferential protrusion 220. The direction of rotation of rotatable shaft 140 about axis 160, (see FIG. 3) has the top portion of shaft 140 rotating out of the plane of the paper. Viscoseal 320 comprises at least one pumping groove 325 used for pumping escaping thermal shunt droplets leaked from main cavity 330. For example, during periods of large vibration (e.g., as may be expressed under start operation, shutdown, or casualty situations) under rotation, escaping thermal shunt droplets separate from thermal shunt 280 and are ejected towards the vacuum of x-ray tube assembly 100. The space between the shaft and stator is typically kept at a vacuum due to operating conditions of x-ray tube assembly 100. In operation, escaping thermal shunt droplets contact viscoseal 320 and interact with rotating pumping grooves 325. Viscoseal 320 has a typical width (I) in the range between about 3 mm and about 10 mm.

Pumping grooves 325 minimize leakage outside main cavity 330 by forcing thermal shunt droplets back towards thermal shunt 280 main pool. Pumping groove 325 provides a resisting force caused by the axial velocity component of pumping grooves 325 to the normally tangential flow of escaping thermal shunt droplets. The position of pumping groove 325 is at an angle (Ø), measured from a circumferential line perpendicular to longitudinally extending axis 160, which is typically the range between about 10 degrees and about 40 degrees. Additionally, the depth (not shown) of pumping groove 325 is typically in the range between about 1 $\mu$m and about 200 $\mu$m.

Capture cavities 305, disposed in circumferential protrusion 220, are disposed to prevent escaping thermal shunt droplets from reaching the vacuum of x-ray tube assembly 100. Capture cavities 305, in conjunction with capillary seal formed by radial distance x and viscoseal 320, act to prevent the motion of escaping thermal shunt droplets from main cavity 330 to areas where droplets can impair x-ray tube operation by corrosion or cause high voltage interference. Capture cavities 305 are disposed in circumferential protrusion so as to face viscoseal 320. Viscoseal 320 has a viscoseal first surface 322 portion that precedes the inboard capillary section of circumferential protrusion 220 by a distance z. Inboard capillary section is defined as the area (defined by distance z) closest to main cavity 330 that is between circumferential protrusion first surface 300 and viscoseal 320. Distance z is typically in the range between about 1 mm and about 5 mm (the segment of viscoseal 320 as defined by distance z is hereinafter referred to as segment "z"). In operation, escaping thermal shunt droplets initially interact with segment z so as to allow pumping grooves 325 to redirect escaping thermal shunt droplets back to main cavity 330 through the forces created by the axial velocity component of pumping grooves 325 on any escaping thermal shunt droplets. Capture cavity 305 prevents flow of escaping thermal shunt droplets by providing a storage location for thermal shunt droplets that escape segment z and the inboard capillary seal section of circumferential protrusion 220. In operation, the corner 350 created at every edge of each capture cavity 305 also typically serves as a pinning site to accumulate escaping thermal shunt droplets by providing capillary forces that help decrease thermal shunt flow. It may be appreciated that accumulated thermal shunt droplets, if they fill capture cavity 305 sufficiently to provide thermal contact between rotatable shaft 140 and circumferential protrusion 220, also serve as a medium to dissipate heat from rotatable shaft 140 to x-ray tube stator 180. Capture cavities 305 thus provide additional containment mains (in addition to viscoseal 320 and capillary edge seal) that serves to minimize leakage of thermal shunt 280 material.

The cross-sectional shape of capture cavity 305 are selected in fabrication and include, for example, square, rectangular, circular, elliptical or irregular shapes. The depth (d) of capture cavity 305 is typically in the range between about 0.1 mm and about 2 mm. In addition, capture cavity 305 width (w) is typically in the range between about 0.2 mm and about 2 mm and the distance (y) between respective adjacent capture cavities 305 is typically in the range between about 1 mm and about 10 mm.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A bearing assembly for a rotating machine comprising:
   a rotatable shaft;
   a stator having at least one circumferential protrusion comprising respective segments that extend from said stator so as to define therebetween a main cavity adapted to house a thermal shunt, and at least one capture cavity disposed in each of said respective segments; and
   at least one viscoseal disposed on said rotatable shaft.

2. The bearing assembly of claim 1, wherein said stator circumferentially surrounds said rotatable shaft.

3. The bearing assembly of claim 1, wherein said stator is an x-ray tube stator.

4. The bearing assembly of claim 1, wherein said rotatable shaft has a generally longitudinally extending axis coaxially aligned with said stator.

5. The bearing assembly of claim 1, wherein said rotating machine further comprises roller element bearings.

6. The bearing assembly of claim 5, wherein said roller element bearings are disposed radially between said shaft and said stator.

7. The bearing assembly of claim 1, wherein said at least one capture cavity is disposed in each of said respective segments so as to face said viscoseal.

8. The bearing assembly of claim 1, wherein the depth of said at least one capture cavity is in the range between about 0.1 mm and about 2 mm.

9. The bearing assembly of claim 1, wherein the width of said at least one capture cavity is in the range between about 0.2 mm and about 2 mm.

10. The bearing assembly of claim 1, wherein the distance between respective ones of said capture cavities disposed in one of said respective segments of said at least one circumferential protrusion is in the range between about 1 mm and about 10 mm.

11. The bearing assembly of claim 1, wherein the cross-sectional shape of said at least one capture cavity is selected from a group consisting of square, rectangular, circular, elliptical and irregular shapes.

12. The bearing assembly of claim 1, wherein the cross-sectional shape of said main cavity is selected from a group consisting of square, trapezoidal and irregular shapes.

13. The bearing assembly of claim 1, wherein the main cavity is coated with a wetting agent.

14. The bearing assembly of claim 13, wherein said wetting agent is gold (Au).

15. The bearing assembly of claim 1, wherein said at least one circumferential protrusion has a circumferential protrusion first surface.

16. The bearing assembly of claim 15, wherein the radial distance between said circumferential protrusion first surface and said rotatable shaft is in the range between about 10 μm and about 200 μm.

17. The bearing assembly of claim 15, wherein said at least one circumferential protrusion first surface is coated with an anti-wetting agent.

18. The bearing assembly of claim 17, wherein said anti-wetting agent comprises titanium nitride (TiN).

19. The bearing assembly of claim 17, wherein said anti-wetting agent comprises titanium dioxide.

20. An x-ray tube assembly comprising:

a rotatable shaft;

a stator, having at least one circumferential protrusion comprising respective segments that extend from said stator so as to define therebetween a main cavity, said respective segments each being disposed in a spaced relationship with said rotatable shaft so as to provide a capillary edge seal when said rotatable shaft is rotating, each said respective segments further having at least one capture cavity disposed therein;

a thermal shunt; and a viscoseal disposed on said rotatable shaft, wherein said capture cavity is disposed in each of said respective segments so as to face said viscoseal.

21. The x-ray tube assembly of claim 20, wherein said least one capture cavity is disposed in each said respective segments so as to be disposed opposite a portion of said viscoseal.

22. The x-ray tube assembly of claim 20, wherein said rotatable shaft has a generally longitudinally extending axis coaxially aligned with said stator.

23. The x-ray tube assembly of claim 20, wherein the depth of said at least one capture cavity is in the range between about 0.1 mm and about 2 mm.

24. The x-ray tube assembly of claim 20, wherein the distance between respective ones of said capture cavities disposed in said respective segments of said at least one circumferential protrusion is in the range between about 1 mm and about 10 mm.

25. The x-ray tube assembly of claim 20, wherein the cross-sectional shape of said at least one capture cavity is selected from a group consisting of square, rectangular, circular, elliptical and irregular shapes.

26. The x-ray tube assembly of claim 20, wherein said at least one circumferential protrusion has a circumferential protrusion first surface coated with an anti-wetting agent.

27. The x-ray tube assembly of claim 26, wherein said anti-wetting agent comprises titanium nitride (TiN).

28. The x-ray tube assembly of claim 26, wherein said anti-wetting agent comprises titanium dioxide.

29. The x-ray tube assembly of claim 26, wherein the radial distance between said circumferential protrusion first surface and said rotatable shaft is in the range between about 10 μm and about 200 μm.

* * * * *